United States Patent
Kitani et al.

[11] Patent Number: 5,924,436
[45] Date of Patent: Jul. 20, 1999

[54] CONNECTING CONSTRUCTION OF BRANCH PIPE AND CONNECTING METHOD THEREOF

[75] Inventors: Kenji Kitani, Higashiosaka; Shintaro Suzuki; Kosuke Sakai, both of Sanda, all of Japan

[73] Assignee: Waterworks Technology Development Organization Co., Ltd., Japan

[21] Appl. No.: 09/056,186

[22] Filed: Apr. 6, 1998

[30] Foreign Application Priority Data

Apr. 11, 1997 [JP] Japan ................................. 9-093704

[51] Int. Cl.$^6$ .............................. F16K 43/00; F16L 41/06
[52] U.S. Cl. .............................. 137/15; 137/318; 138/94; 138/97; 285/197; 408/87; 408/99; 408/103; 408/110
[58] Field of Search ........................ 137/15, 318; 138/94, 138/97; 285/197; 408/87, 99, 103, 104, 110

[56] References Cited

U.S. PATENT DOCUMENTS

| | | | |
|---|---|---|---|
| 1,743,338 | 1/1930 | Field | 137/318 |
| 1,898,935 | 2/1933 | Brandiff | 137/318 |
| 2,171,942 | 9/1939 | Mueller | 137/318 |
| 2,188,607 | 1/1940 | Larry et al. | 137/318 |
| 2,972,915 | 2/1961 | Milanovits et al. | 137/318 |
| 3,948,282 | 4/1976 | Yano | 137/15 |
| 4,127,141 | 11/1978 | Ledonne et al. | 137/318 |
| 4,719,936 | 1/1988 | Tsubakimoto et al. | 138/92 |
| 5,044,393 | 9/1991 | Jiles | 137/318 |
| 5,186,199 | 2/1993 | Murphy et al. | 137/318 |

FOREIGN PATENT DOCUMENTS

| | | |
|---|---|---|
| 0713047 | 5/1996 | European Pat. Off. . |
| 2739169 | 3/1997 | France . |
| 7113489 | 5/1995 | Japan . |
| 1368751 | 10/1974 | United Kingdom . |

OTHER PUBLICATIONS

Patent Abstracts of Japan No. 07113489. published May 2, 1996, entitled "Pipe Coupling and Installation Thereof" inventor Yokoyama Gunpei, 1 page.

*Primary Examiner*—George L. Walton
*Attorney, Agent, or Firm*—Webb Ziesenheim Logsdon Orkin & Hanson, P.C.

[57] ABSTRACT

A connecting construction of a branch pipe is disclosed. The construction includes a branch-pipe joint fixed to an outer peripheral face of an existing pipe and attached to a passage forming member for forming, between the passage forming member and the outer peripheral face of the existing pipe, a guide passage extending from a lower portion to an upper portion of the existing pipe along a peripheral direction of the pipe, with the branch-pipe joint being oriented along a radial direction of the existing pipe so that a branching pipe portion thereof for branch-pipe connection is opened at an upper portion within the guide passage, and a closing member for closing an upper through hole after formation of a lower through hole, the upper through hole being provided in an upper pipe wall of the existing pipe for forming, in a lower pipe wall of the existing pipe, the lower through hole communicated with a lower portion inside the guide passage through the branching pipe portion, with the closure of the upper through hole, communication being established between a branch pipe connected to the branching pipe portion and the existing pipe through the guide passage and the lower through hole. The closing member is fixed to the branching pipe portion. A method of connecting a branch pipe is also disclosed.

8 Claims, 14 Drawing Sheets

CONNECTING CONSTRUCTION OF BRANCH PIPE AND CONNECTING METHOD THEREOF

BACKGROUND OF THE INVENTION

1. Field of the Invention

The present invention relates to a connecting construction of a branch pipe and a connection method thereof. More particularly, the invention relates to a connecting construction of a branch pipe, which includes a branch-pipe joint fixed to an outer peripheral face of an existing pipe and attached to a passage forming member for forming, between the passage forming member and the outer peripheral face of the existing pipe, a guide passage extending from a lower portion to an upper portion of the existing pipe along a peripheral direction of the pipe, with the branch-pipe joint being oriented along a radial direction of the existing pipe so that a branching pipe portion thereof for branch-pipe connection is opened at an upper portion within the guide passage and a closing member for closing an upper through hole after formation of a lower through hole, the upper through hole being provided in an upper pipe wall of the existing pipe for forming, in a lower pipe wall of the existing pipe, the lower through hole communicated with a lower portion inside the guide passage through the branching pipe portion, with the closure of the upper through hole, communication being established between a branch pipe connected to the branching pipe portion and the existing pipe through the guide passage and the lower through hole.

2. Description of the Related Art

According to the above-noted connecting construction of a branch pipe, the branch-pipe joint forming, between this joint and the outer peripheral face of the existing pipe, the guide passage extending from the lower to upper portion of the existing pipe along the peripheral direction of the pipe is secured to the existing pipe, so that the existing pipe and the lower portion of the existing pipe are connected with each other via the guide passage in the form of a spiral passage formed by the branch-pipe joint. With this construction, in connecting the branch pipe for e.g. newly installing a fire hydrant to a water pipe as the existing pipe, substance such as sand or rust accumulated or deposited at the bottom of the water pipe may be discharged efficiently together with the flow of water discharged from the fire hydrant.

And, according to the conventional branch-pipe connecting construction, for closing the upper through hole formed in the upper pipe wall of the existing pipe, as described in e.g. the Japanese laid-open patent gazette Hei. 7-113489, a manipulator rod is attached to the closing member in the form of a plate having upper and lower flanges along the peripheral edges thereof and then this closing member is inserted into the guide passage through the branching pipe portion. Then, the closing member inserted in the guide passage is forced into the upper through hole while the position of the member is being controlled by the manipulator rod from outside the branching pipe portion, so that the peripheral edge of the upper through hole is fitted between the upper and lower flanges of the closing member, thereby fixing the closing member to the existing pipe.

According the convention described above, the closing member introduced into the guide passage is pushed into the upper through hole while being controlled in position from outside the branching pipe portion so as to be fixed to the existing pipe per se. Therefore, the precise positioning of the closing member relative to the upper through hole is difficult and the efficiency of the operation is poor.

The present invention attends to the above drawback of the conventional art and a primary object of the invention is to overcome this drawback by providing an improved branch-pipe connecting construction while facilitates the accurate positioning of the closing member to the upper through hole for improved operation efficiency, by devising improved fixing arrangement of the closing member.

SUMMARY OF THE INVENTION

For accomplishing the above-noted object, in the connecting construction of a branch pipe described at the onset, according to one aspect of the present invention, the closing member is fixed to the branching pipe portion.

With this feature of the closing member being fixed to the branching pipe portion, the closing member and the branching pipe portion are positioned in a predetermined position relative to each other and then fixed together. With this, the upper through hole may be readily and reliably closed by the closing member.

Therefore, unlike the conventional art, the construction according to the invention has eliminated the necessity of fixing the closing member to the existing pipe per se; and the relative position of the closing member introduced in the guide passage relative to the upper through hole may be determined as the relative position between the closing member and the branching pipe portion. Hence, the accurate positioning of the closing member to the upper through hole has been facilitated and the efficiency of the connecting operation has been improved.

According to further aspect of the present invention, in the connecting construction of a branch pipe, the closing member is attached to a support member inserted into the branching pipe portion, and the support member is bolted to a branch-pipe connecting flange formed adjacent a branch-pipe connecting opening of the branching pipe portion.

With the above construction, for fixing the closing member to the branching pipe portion, the branch-pipe connecting flange may be advantageously utilized. This makes the fixing arrangement of the closing member simpler.

According to a still further aspect of the present invention, the support member comprises a cylindrical member having an opening communicated with the guide passage and engaged within the guide passage.

With the above-described construction, the fluid entering through the guide passage may run smoothly along the inner face of the cylindrical member constituting the support member toward the branching pipe portion. Thus, this construction can assure smooth running of the fluid.

According to a method of connecting a branch pipe to which the present invention also relates, the method comprises the steps of:

fixedly and water-tightly connecting a branch-pipe joint to an outer peripheral face of an existing pipe to form a guide passage between the outer peripheral face of the existing pipe and an inner peripheral face of the branch-pipe joint attaching a partitioning valve to a branching pipe portion for branch-pipe connection;

fixing a first enclosure casing accommodating a cutter of a boring machine therein to the partitioning valve;

opening the partitioning valve to allow insertion of the cutter into the guide passage to form an upper through hole in the existing pipe;

removing cutting dust generated in association with the formation of the upper through hole and then inserting the cutter through the upper through hole to form a lower through hole in the existing pipe;

closing the partitioning valve and then removing the boring cutter;

opening the partitioning valve again to lower, through the branching pipe portion, a second enclosure casing accommodating therein a support member including a closing member, thus inserting the closing member into the upper through hole for closing this upper through hole and fixing the closing member in position; and removing the partitioning member and the second enclosure casing and connecting a branch pipe to the support member.

Further and other features and advantages of the invention will become more apparent from the following detailed description of the invention with reference to the accompanying drawings.

DETAILED DESCRIPTION OF THE PREFERRED EMBODIMENTS

Now preferred embodiments of a connecting construction of a branch pipe relating to the present invention will be described in details with reference to the accompanying drawings.

Figure 1:
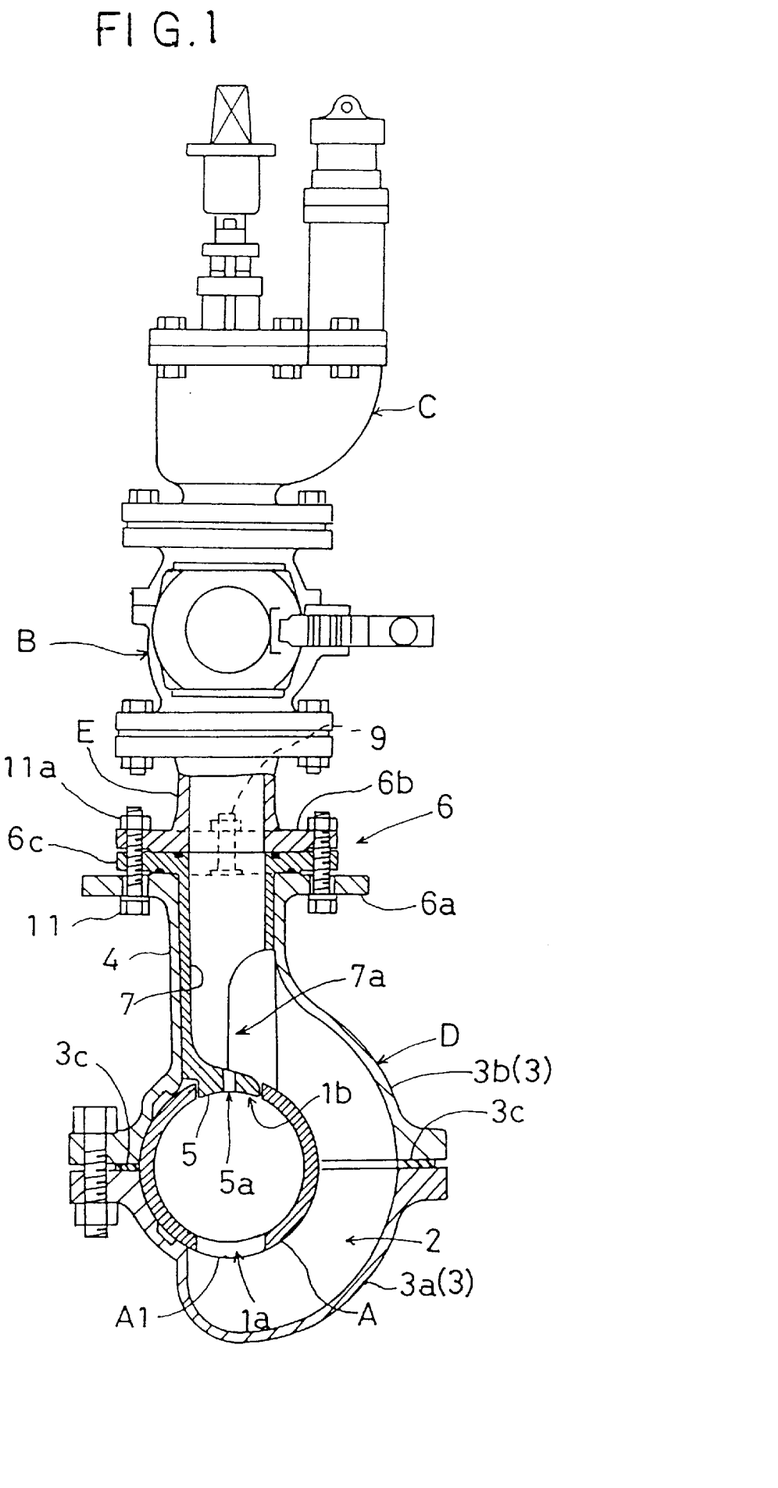
FIG. 1 is a front view in partial section showing a connecting construction of a branch pipe.
Figure 2:
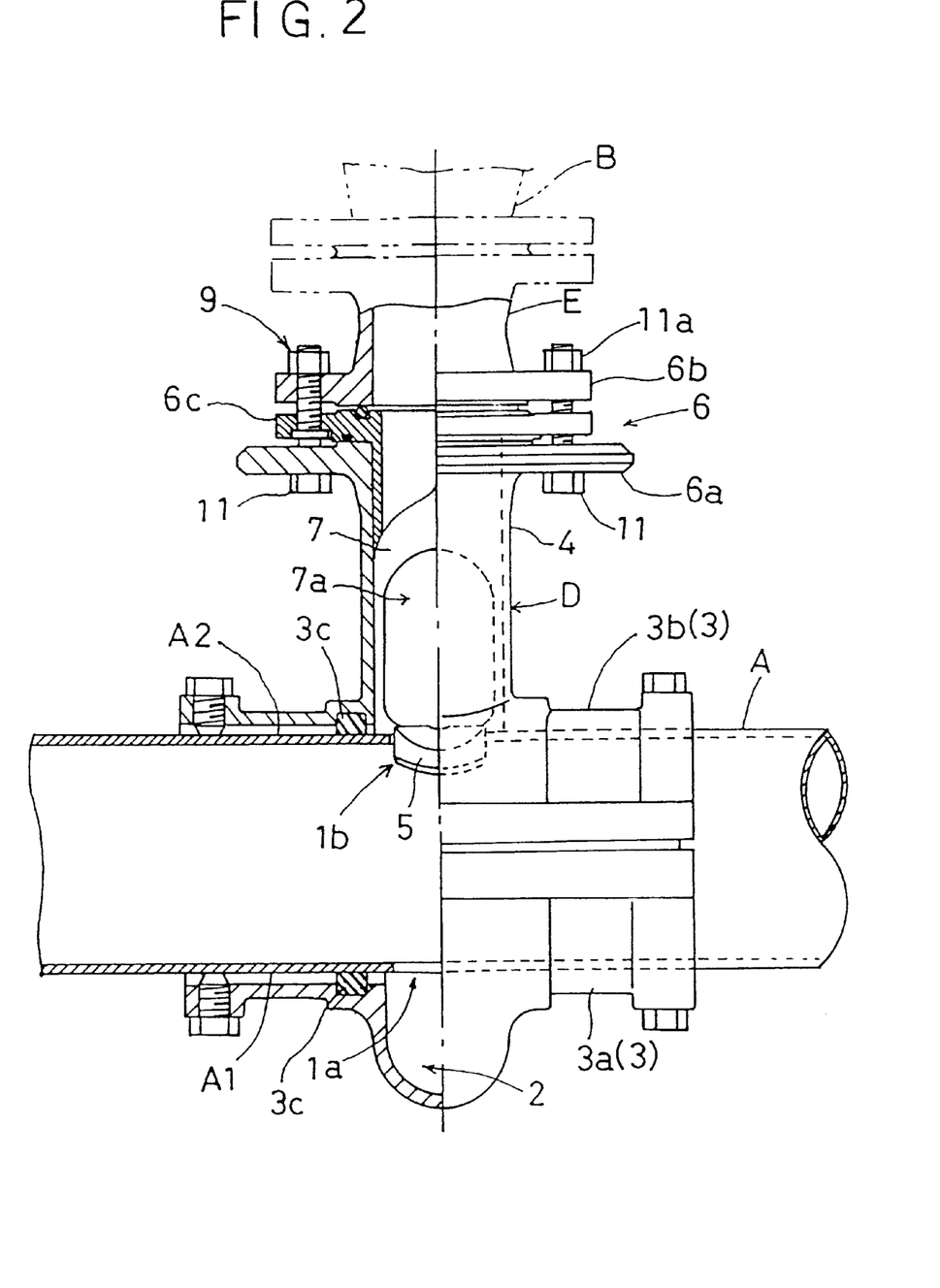
FIG. 2 is a side view in partial section showing a connecting construction of a branch pipe.
Figure 3:
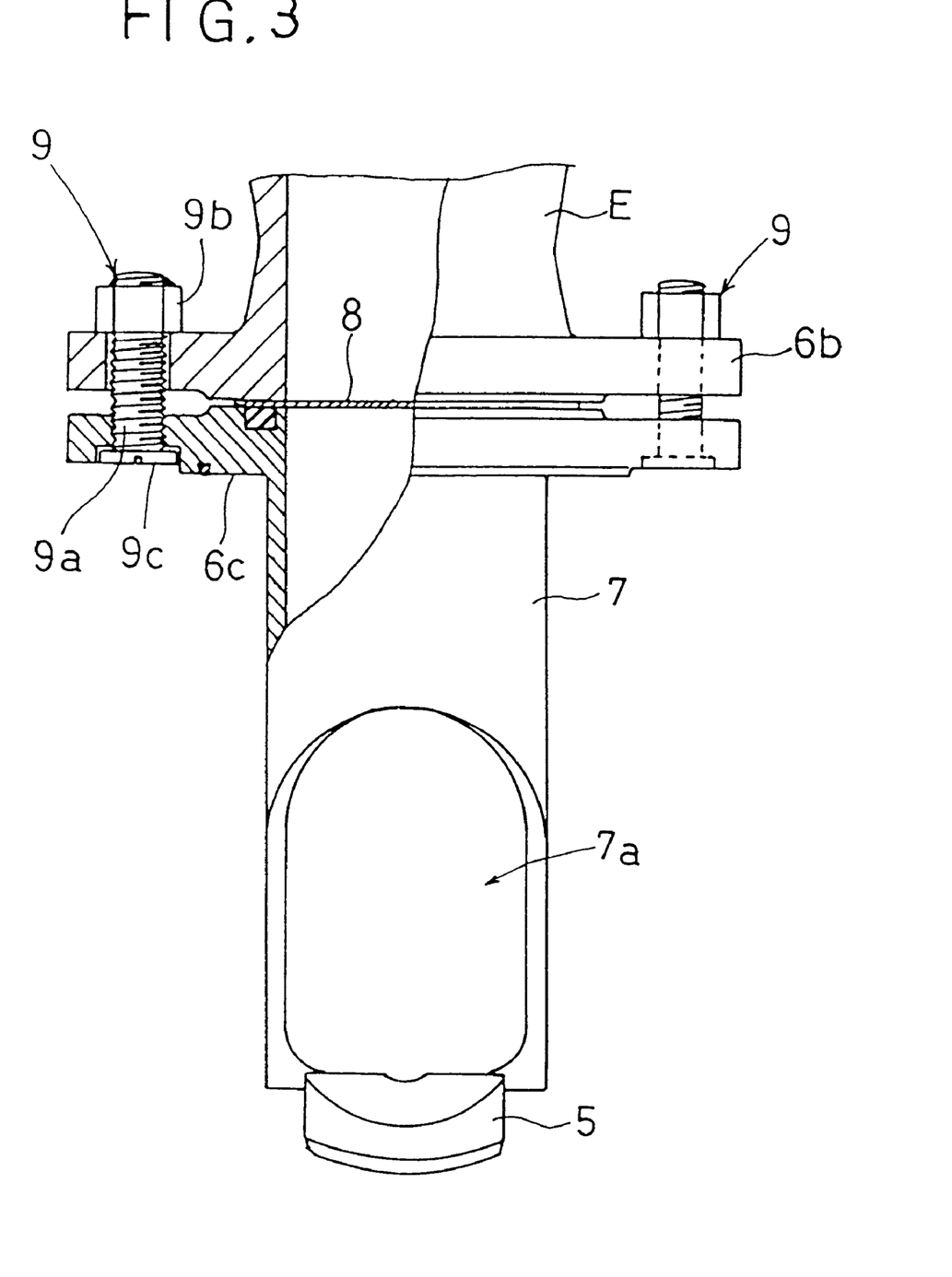
FIG. 3 is a side view in partial section showing a temporary fixing condition between a short pipe and a cylindrical member.

FIGS. 1 and 2 show a connecting construction of a branch pipe according to one preferred embodiment of the present invention. In this construction, an existing water pipe A installed underground as an example of an existing pipe and a branch pipe B with a ball valve as an example of a branch pipe to which a fire hydrant C is connected, are connected in communication with each other via a branch-pipe joint D made of ductile cast iron. The branch-pipe joint D is constructed so as to connect and communicate the existing water pipe A and the branch pipe B with each other through a spiral guide passage formed between the joint and an outer peripheral face of the existing water pipe A and extending from an upper portion to lower portion of the existing pipe and along the periphery of the existing pipe and a lower through hole 1a defined in a lower wall portion A1 of the existing pipe A in communication with a lower inner portion of the guide passage 2.

The branch-pipe joint D includes a tubular passage forming member 3 to be water-tightly fixed to the outer peripheral face of the existing water pipe A, a branching pipe portion 4 for branch-pipe connection formed integrally with the passage forming member 3, and a closing member 5 for closing an upper through hole 1b which is provided in an upper pipe wall A2 of the existing water pipe A for the purpose of forming the lower through hole 1a. Then, the guide passage 2 is formed between the outer peripheral face of the existing water pipe A and the inner face of the passage forming member 3. Further, the branch-pipe joint D is disposed substantially vertical so as to allow the branching pipe portion 4 thereof to be opened at an upper portion inside the guide passage 2.

The branch pipe B is constructed so as to be connected with a short pipe E as a connecting pipe portion, which in turn is connected to the branching pipe portion 4 via a flange joint 6. Then, water entering through the lower through hole 1a of the existing water pipe A is caused to flow and be guided along the outer peripheral face of the existing water pipe A to the upper peripheral portion thereof and then into the branching pipe portion 4 and then this water may be discharged via the branch pipe B connected with the short pipe E out of the fire hydrant C.

The passage forming member 3 is formed as a tubular member for surrounding the outer peripheral face of the existing water pipe A. For this purpose, the passage forming member 3 is comprised of two upper and lower separate portions 3a, 3b which are adapted for vertically holding and binding the outer peripheral face of the existing water pipe A along the radial direction thereof therebetween. Further, the separate portions 3a, 3b are bulged radially outward along the peripheral direction of the existing water pipe A, so that the continuous guide passage 2 is formed inside the separate portions. The guide passage 2 extends, with a constant, i.e. invariable diameter, from a position immediately downwardly of the lower through hole 1a of the existing water pipe A along the periphery of the pipe A. Between the two separate portions 3a, 3b and the existing water pipe A and also between the two separate portions 3a, 3b themselves, there is interposed a rubber packing 3c.

The closing member 5 is formed integrally with a lower end of a round cylindrical member 7, which is to be fitted within the branching pipe portion 4, and the closing member 5 defines at the center thereof an air bleeder hole 5a.

The cylindrical member 7 includes a fixing flange 6c to be bound and fixed between an upper flange 6a formed at an upper portion of the branching pipe portion 4 and a lower flange 6b formed at a lower portion of the short pipe E and an opening 7a communicated with the guide passage 2.

Then, as the cylindrical member 7 with its opening 7a oriented to face the guide passage 2 is bound and fixed between the upper flange 6a and the lower flange 6b by means of the fixing flange 6c, the closing member 5 is inserted into the upper through hole 1b for closing this upper through hole, with forming a gap (f) (see FIG. 5) between the closing member 5 and the peripheral edge of the upper through hole.

Thus, the closing member 5 is attached to the cylindrical member 7 having the opening 7a communicated with the guide passage 2, with the cylindrical member 7 acting as a support member inserted within the branching pipe portion 4. And, through bolt-fixing to the upper flange 6a as a branch-pipe connecting pipe portion provided adjacent the branch-pipe connecting opening of the branching pipe portion 4, the closing member 5 is secured to the branching pipe portion 4. Incidentally, the opening 7a has a bore diameter as large as or larger than the inner diameter of the guide passage 2.

Next, a method of connecting a branch pipe will be described in details with reference to FIGS. 12 through 18.

In general, the branch-pipe joint D is connected with the existing water pipe A pre-installed underground. Then, the branch pipe B is connected via the short pipe E to the branching pipe portion 4 and this branch pipe B and the existing water pipe A are caused to be communicated with each other via the guide passage 2 and the lower through hole 1. These series of operations are effected by the method of the invention, without shutting off the water flow in the existing water pipe A and while preventing outflow of the water from the branch-pipe joint D.

Figure 12:
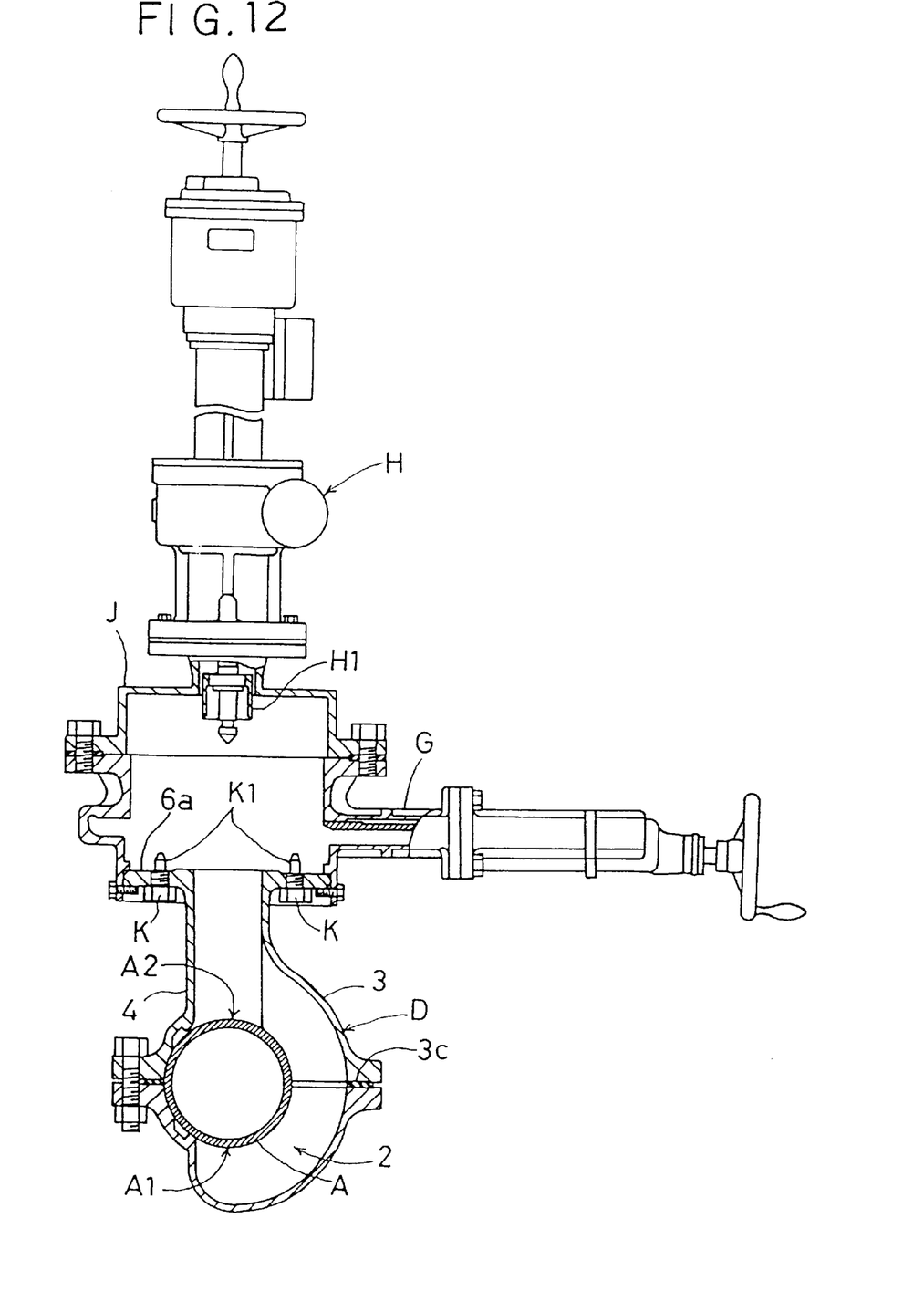
FIGS. 12 through 18 are descriptive views of a method of connecting a branch pipe.

First, a pit is dug at a site where the fire hydrant C is to be installed, so as to expose the existing water pipe A to the ambience. After cleaning the outer peripheral face of the pipe A, the respective separate members 3a, 3b with the packing 3c are water-tightly fitted and connected to the outer peripheral face of the pipe A, so that the guide passage 2 is formed between the inner face of the passage forming member 3 and the outer peripheral face of the existing water pipe A. As illustrated in FIG. 12, a partitioning valve G for the connecting operation is attached to the branching pipe portion 4 and then a first enclosure casing J accommodating a cylindrical cutter H1 of a boring machine H is fixed to this partitioning valve G.

In the bolt holes defined in the upper flange 6a of the branching pipe portion 4, there are threaded water-stopper bolts K having guide pins K1 for fixing the cylindrical member in position.

Figure 13:
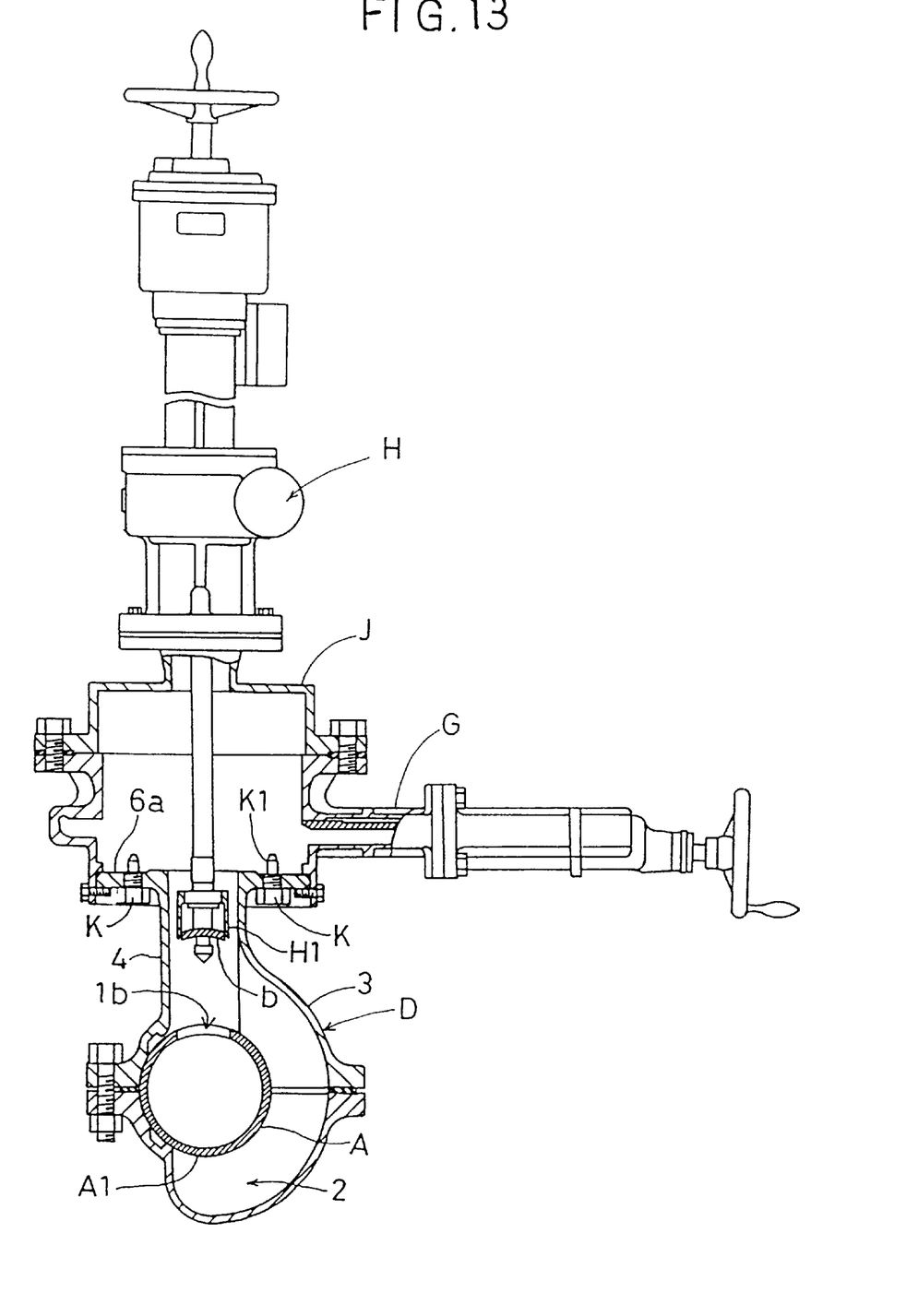
Figure 14:
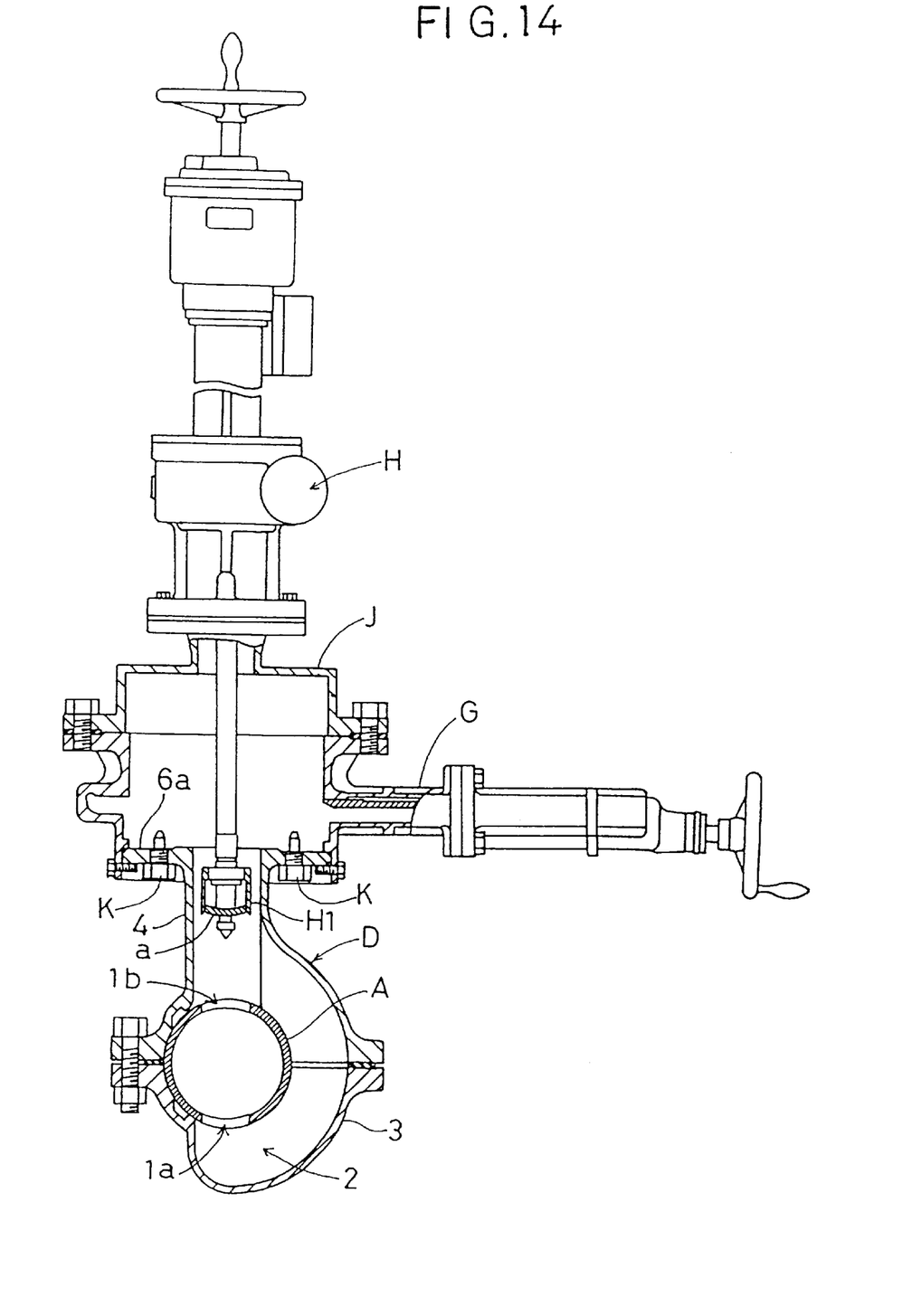

Next, as illustrated in FIG. 13, the partitioning valve G is opened to allow the cutter H1 to be introduced through the branching pipe portion 4 into the guide passage 2. Then, the cutter H1 is operated to define, in the lower pipe wall A1 of the existing water pipe A, the upper through hole 1b for forming the lower through hole 1a in the lower pipe wall A1 of the existing water pipe A. Thereafter, after the cutter H1 retaining cut dust (b) of the upper through hole 1b is lifted above the partitioning valve G, the partitioning valve G is closed and then cut dust (b) is removed from the cutter H1. Next, as illustrated in FIG. 14, the cutter H1 introduced through the upper through hole 1b into the water pipe A is operated for forming the lower through hole 1a in the lower pipe wall A1 of the existing water pipe A, and this cutter H1 retaining cut dust (b) is lifted above the partitioning valve G. Thereafter, the partitioning valve G is closed again and the boring machine H is removed from the partitioning valve G together with the first enclosure casing J.

Figure 15:
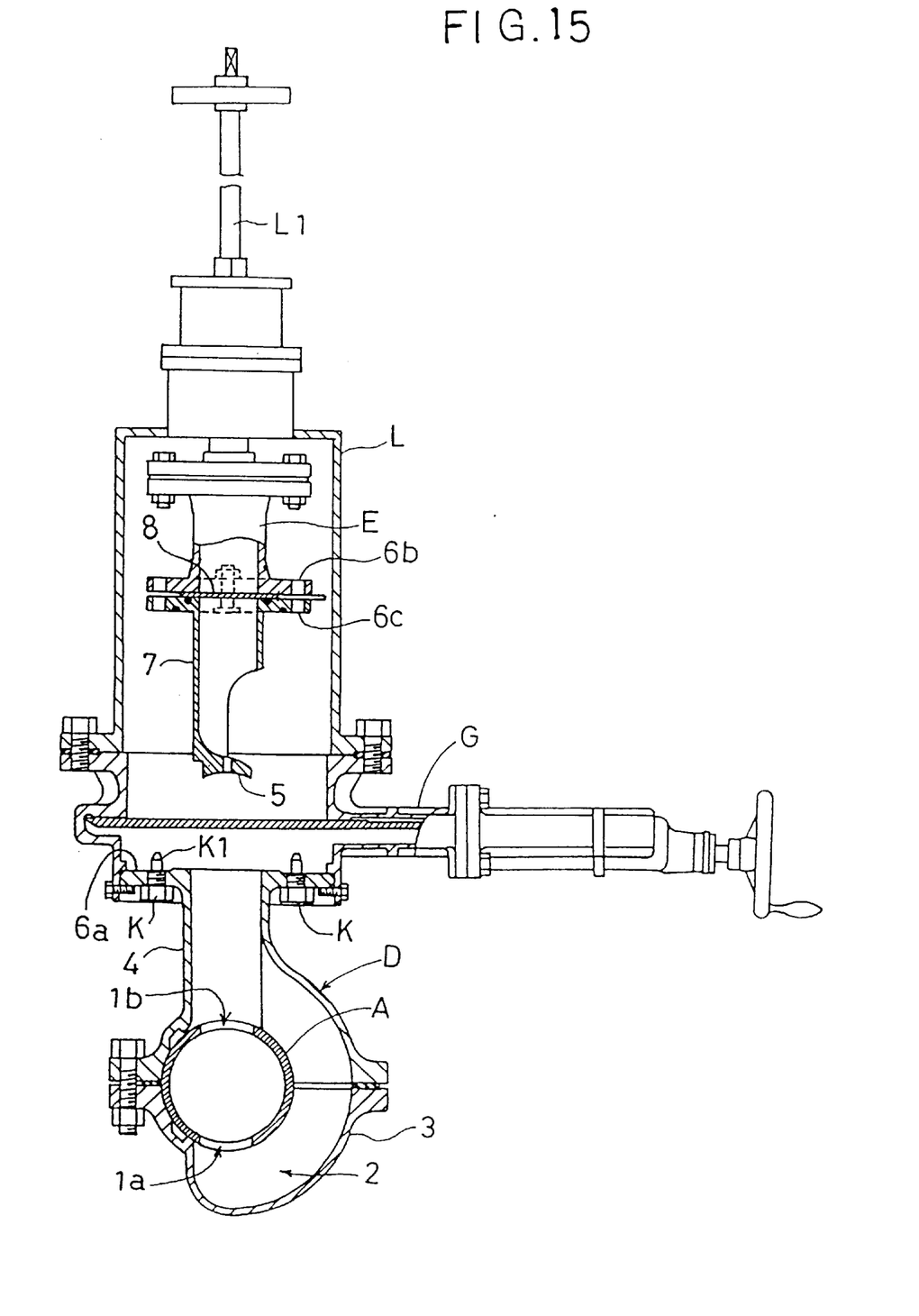

Next, as illustrated in FIG. 15, the second enclosure casing accommodating therein the short pipe E connected to a lifting manipulator member L1 and the cylindrical member 7 is fixed to the partitioning valve G. To the lower flange 6b of the short pipe E set inside the second enclosure casing L, there is bolt-fixed in advance the cylindrical member 7 by means of the fixing flange 6c. The lower flange 6b and the fixing flange 6c are temporarily fixed by means of fixing bolt-nuts 9 attached at two positions opposed to each other in the radial direction of the flange, with withdrawably binding a closing plate 8 for closing the branching pipe portion 4 therebetween.

Figure 4:
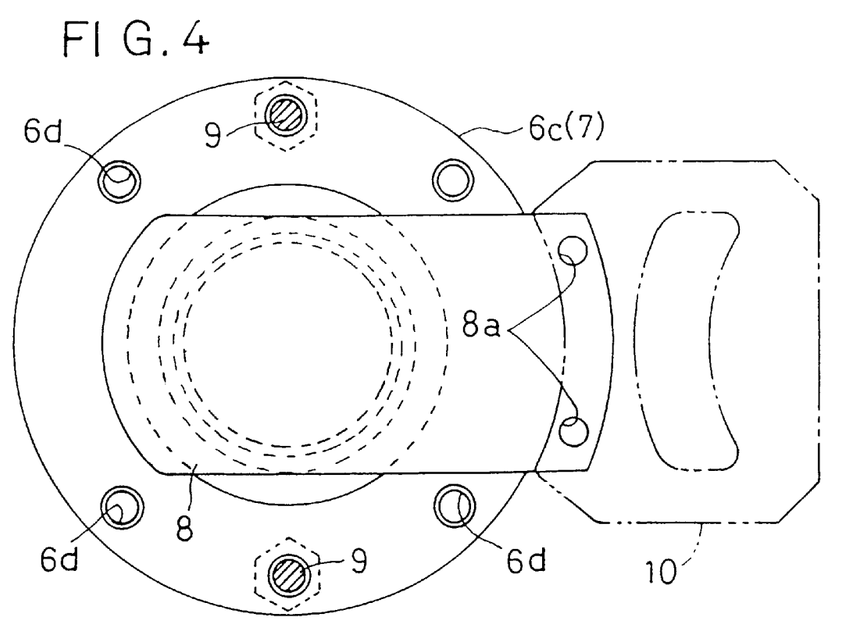
FIG. 4 is a plan view showing an attaching portion of a closing plate for closing a branching pipe portion.

At one end of the closing plate 8, as shown in FIG. 4, there are formed two engaging holes 8a as engaged portions to which there is disengageably engaged a withdrawing tool 10 for withdrawing this closing plate 8 from between the lower flange 6b and the fixing flange 6c, and the bolt-nuts 9 bind the closing plate 8 in such a manner as to allow the engaging holes 8a thereof to be exposed outside between the flanges 6b, 6c.

Figure 6:
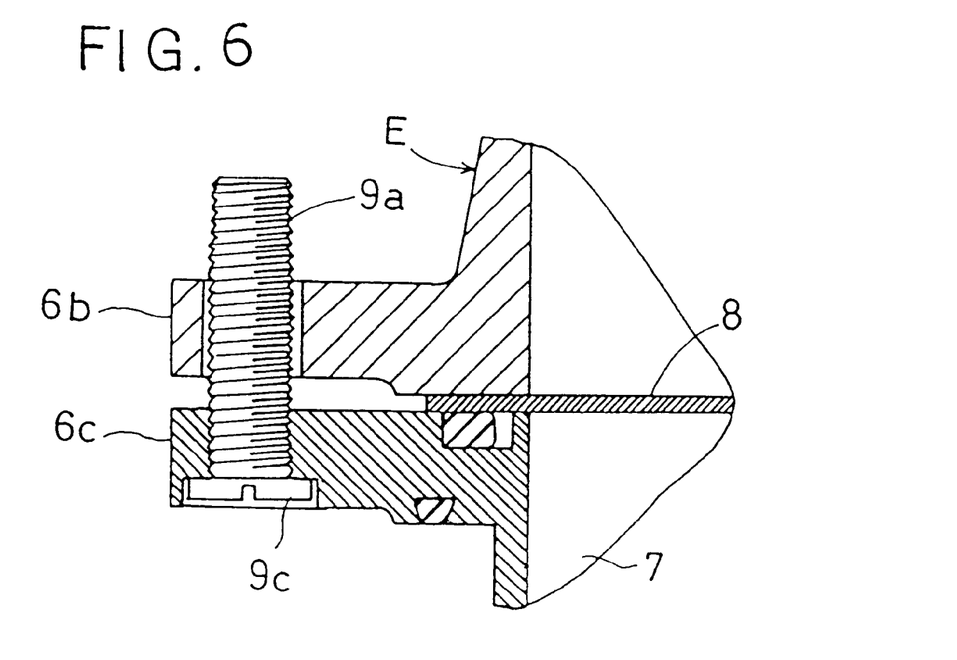
FIG. 6 is a partial section illustrating an operation for fixing the closing plate by two flanges.
Figure 7:
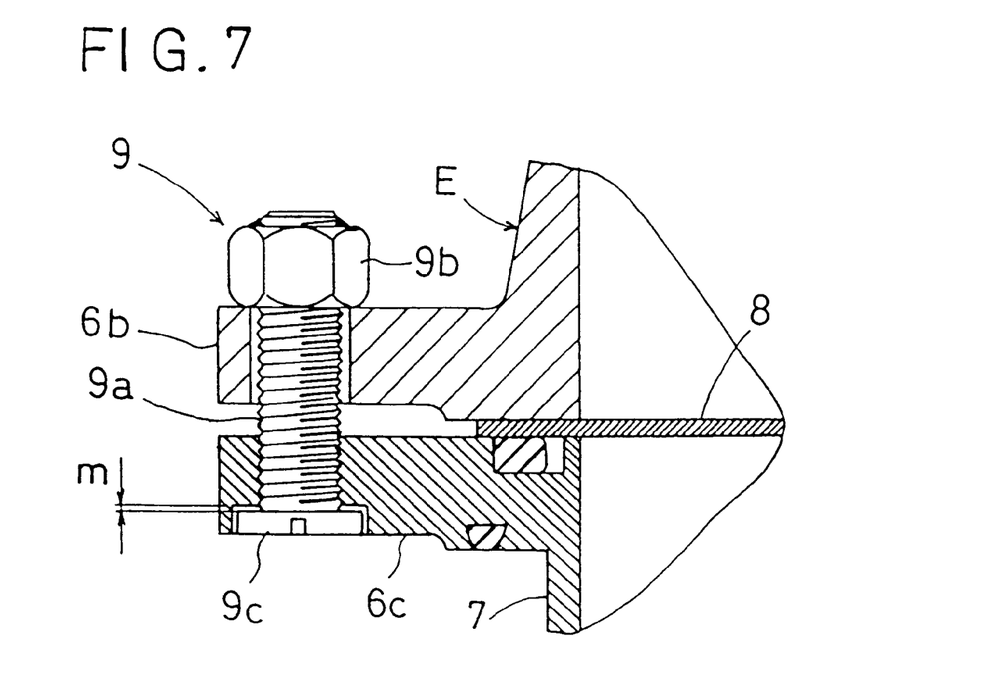
FIG. 7 is a partial section illustrating an operation for fixing the closing plate by two flanges.

FIGS. 6 and 7 illustrate the operations for binding the closing plate 8 between the lower flange 6b and the fixing flange 6c and then fixing it under this condition by means of the bolt-nuts 9. Specifically, a bolt 9a, as the tightening bolt, having a flat head 9c defining a groove into which the leading end of a screw driver is inserted is threaded into the fixing flange 6c until the flat head 9c comes into abutment against the bottom face of the fixing flange 6c. Next, as shown in FIG. 6, by rotating this bolt 9a by a predetermined amount, e.g. by a half rotation, a gap (m) is formed between the flat head 9c and the bottom face of the fixing flange 6c. Then, as shown in FIG. 7, a nut 9b is threaded on the end of the bolt 9a projecting from the lower flange 6c, thereby tightening the lower flange 6b and the fixing flange 6c together. And, the lower flange 6b and the fixing flange 6c are fixed to each other with the closing plate bound therebetween. Under this fixed condition, the bolt 9a and the nut 9b are welded together so as to be rotated in unison.

Accordingly, the bolt 9a is threaded to the fixing bolt 9c as one of the two flanges 6b, 6c binding the closing plate 8 therebetween, and the bolt 9c is provided with the flat head 9c as the abutment element which comes into abutment against the flange 6c in association with loosening of the bolt 9a by the nut 9b. With these, the amount of loosening of the bolt 9a for allowing withdrawal of the closing plate 8 is limited within a predetermined range.

Figure 16:
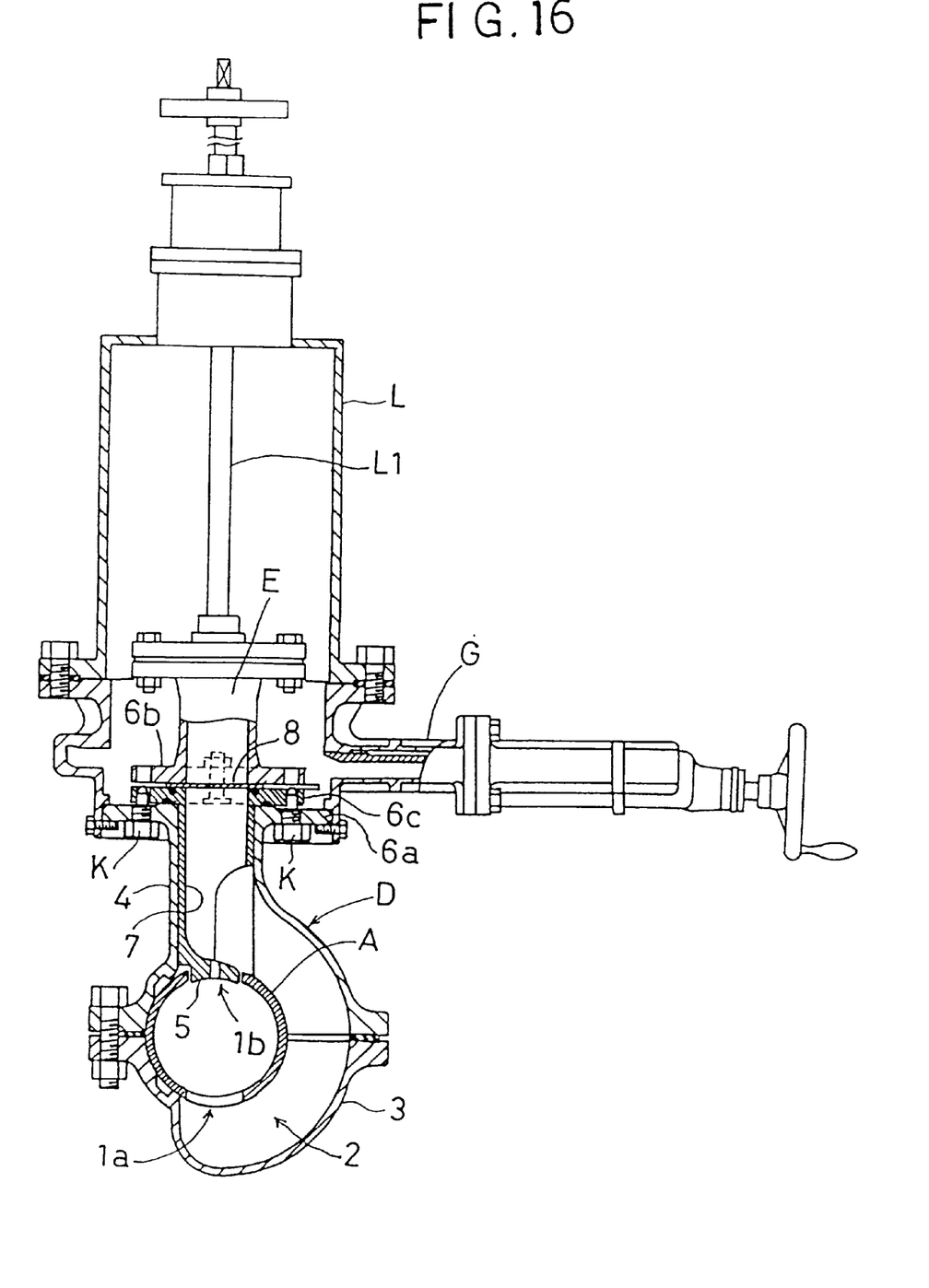
Figure 17:
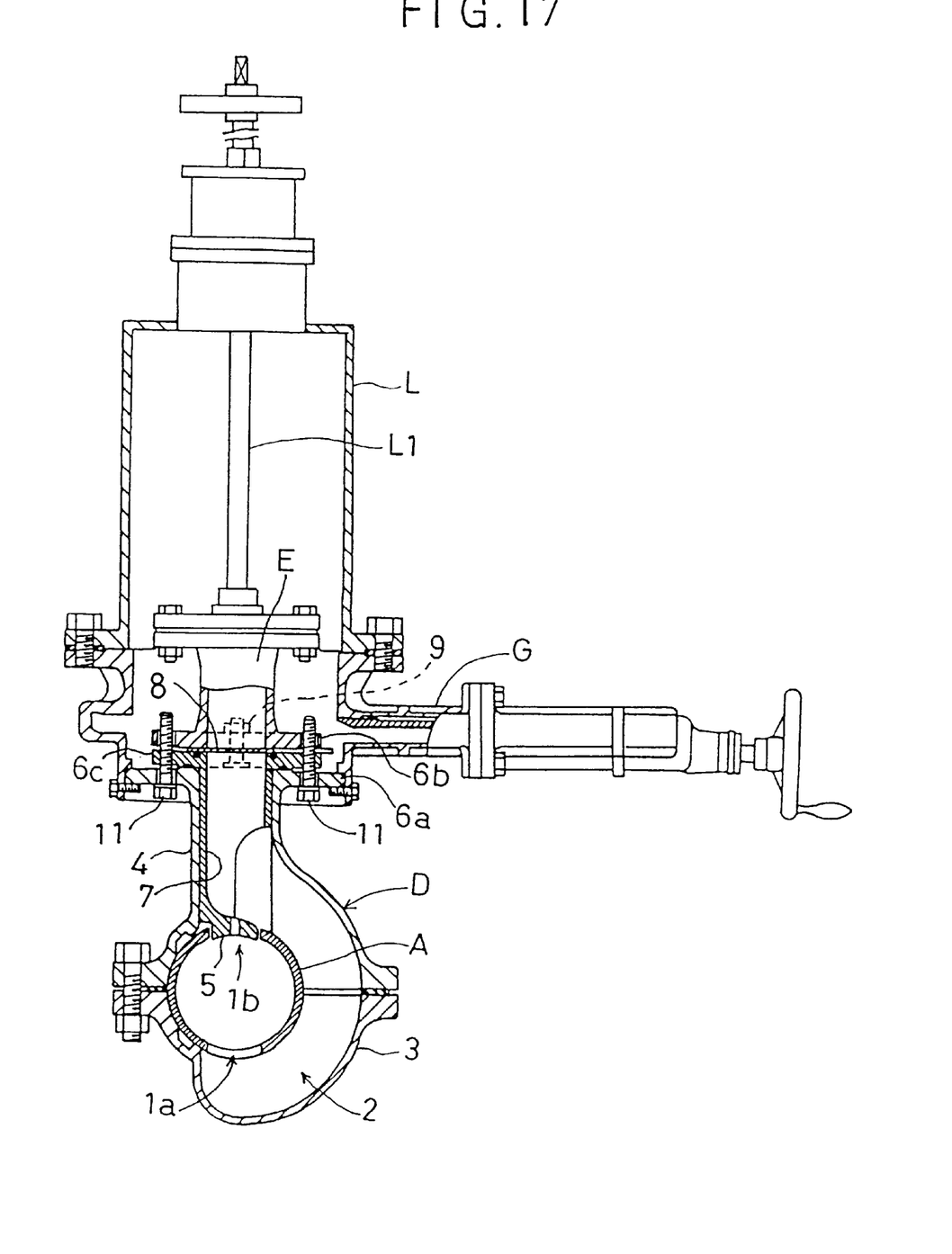

Next, as illustrated in FIG. 16, the partitioning valve G is opened and the manipulator member L1 is manipulated to lower the short pipe E and the cylindrical member 7 through the branching pipe portion 4 until the fixing flange 6c of the cylindrical member 7 comes into abutment against the upper flange 6a of the branching pipe portion 4, and the guide pins K1 of the water-stopper bolts K are introduced into the connecting bolt holes 6d (see FIG. 4) formed at four positions in the fixing flange 4 for determining the set position. Thereafter, while the water-stopper bolts K are loosened, as illustrated in FIG. 17, the connecting bolts 11 inserted in place of the water-stopper bolts K are threaded into the fixing flange 6c, whereby the short pipe 4 is connected to the branching pipe portion 4 via the flange joint 6.

Figure 5:
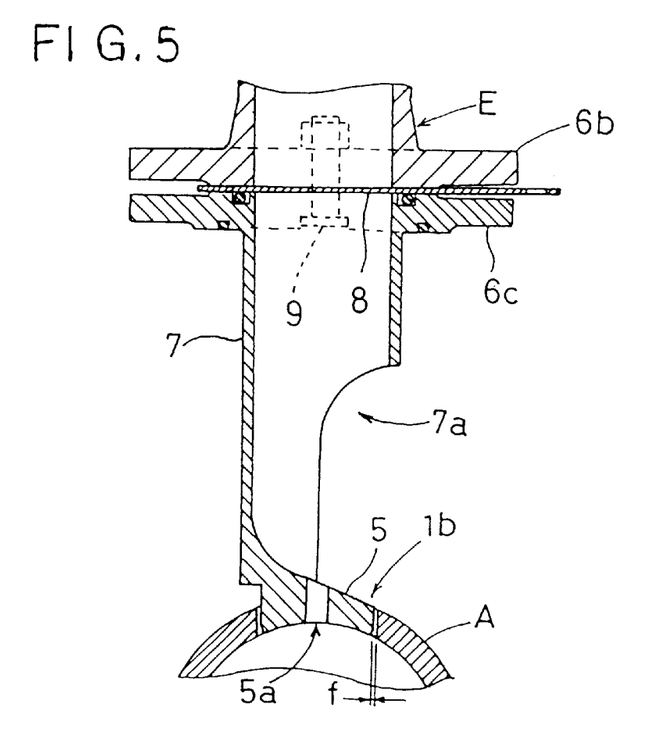
FIG. 5 is a partial section illustrating a condition for preventing outflow of water from the branching pipe portion by means of the closing plate.

Therefore, under the above condition, as shown in FIG. 5, the closing member 5 introduced through the branching pipe portion 4 extends through the upper through hole 1b, thereby closing this upper through hole, and at the same time outflow of water from the branching pipe portion 4 is effectively prevented by the closing plate 8.

Figure 18:
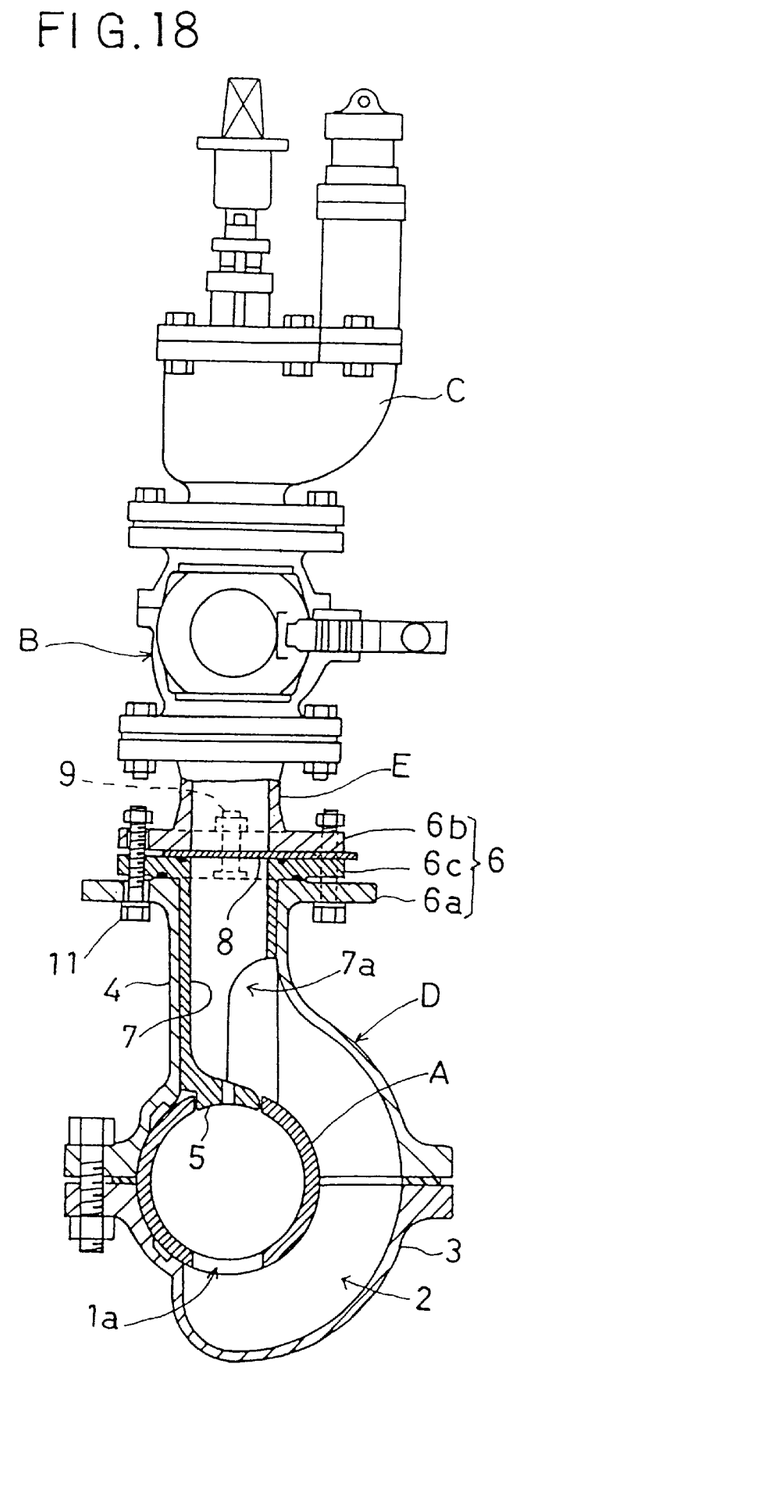

Next, the connection between the second enclosure casing L and the partitioning valve G is released and this second enclosure casing L is lifted up along the manipulator member L1 to release the engagement between the manipulator member L1 and the short pipe E, and then the second enclosure casing is removed from the partitioning valve G. Further, the partitioning valve G is removed from the branching pipe portion 4 and as illustrated in FIG. 18, the branch pipe B is connected to the short pipe E and then the fire hydrant C is connected to this branch pipe B.

Figure 8:
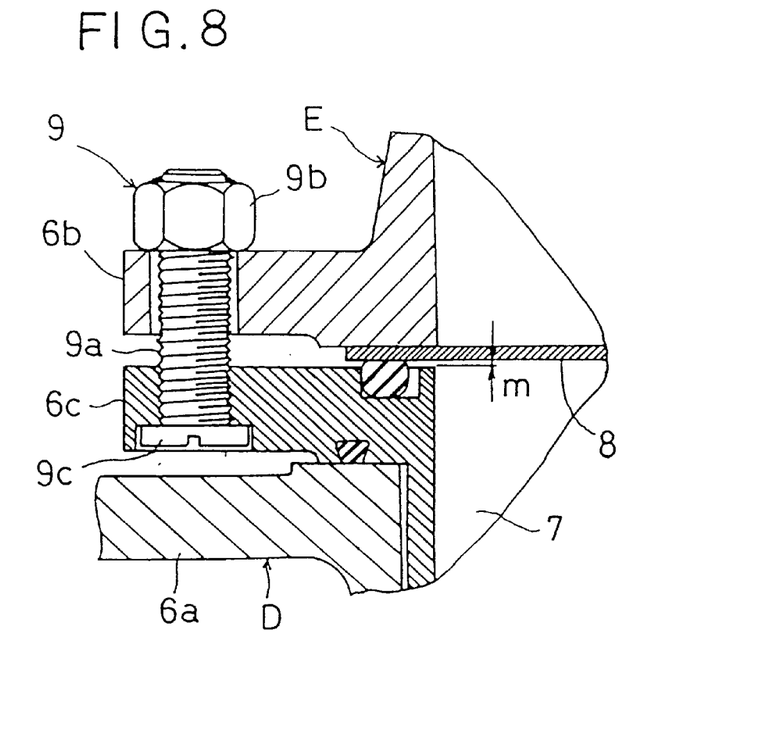
FIG. 8 is a partial section illustrating an operation for removing the closing plate from the two flanges.
Figure 9:
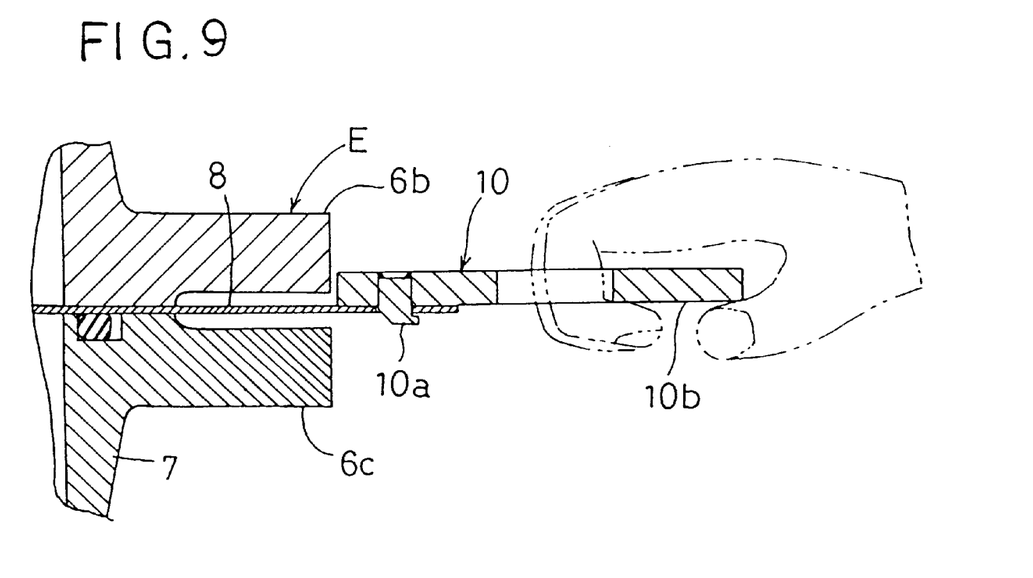
FIG. 9 is a section view illustrating a withdrawing operation of the closing plate by means of a withdrawing tool.

Thereafter, as shown in FIG. 8, the bolts 9a fixing the lower flange 6b and the fixing flange 6c together with binding the closing plate 8 therebetween are driven to rotate from the side of the nuts 9b until the flat heads 9c come into abutment against the bottom face of the fixing flange 6c, thus loosening the flange joint 6. And, as shown in FIG. 9, by engaging the withdrawing tool 10 made of steel with the closing plate 8, this closing plate 8 is withdrawn.

Figure 10:
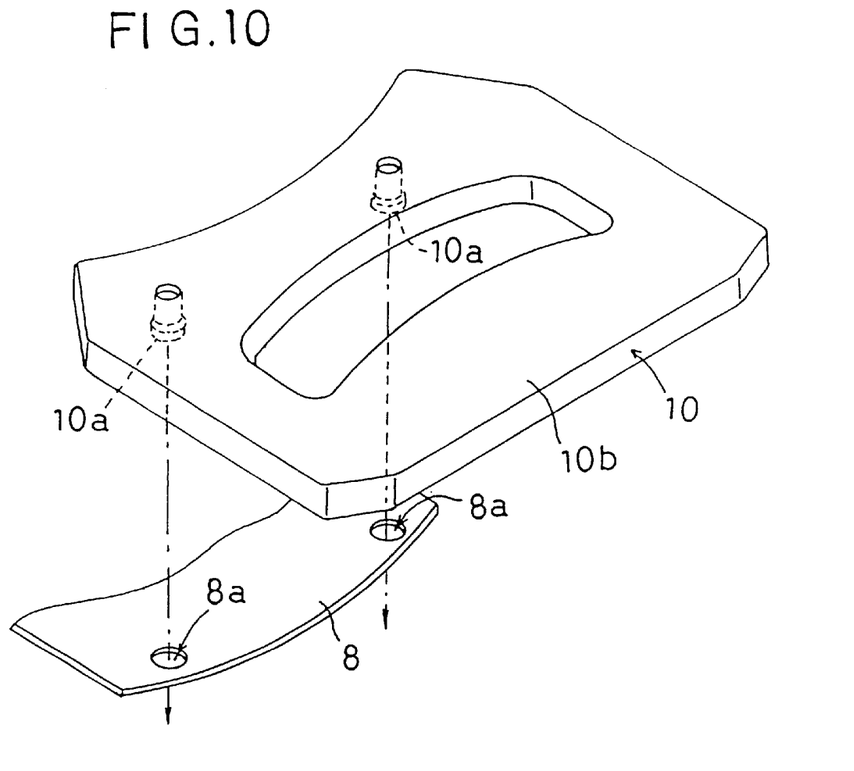
FIG. 10 is a perspective view illustrating connected condition between the closing member and the withdrawing tool.

For this purpose, the withdrawing tool 10, as shown in FIG. 10, includes engaging projections 10a for engaging with the engaging holes 8a of the closing plate 8 and a grip portion 10b. Thus, while the engaging projections 10a are engaged with the respective engaging holes 8a, the grip portion 10b is gripped with a hand and pulled along the radial direction of the flange, whereby the closing plate 8 may be smoothly and readily withdrawn.

Figure 11:
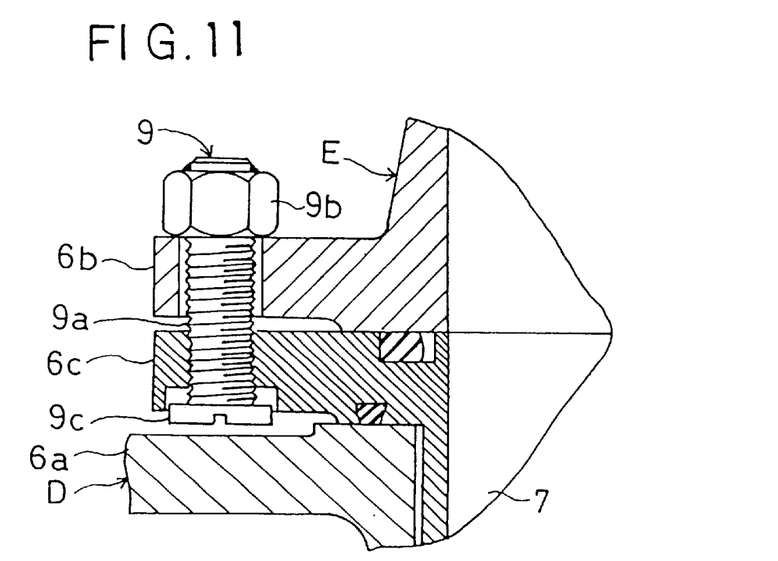
FIG. 11 is a partial section for illustrating an operation of fixing two flanges after withdrawal of the closing member.

Next, as illustrated in FIG. 11, the bolts 9a are tightened for fixing the lower flange 6b and the fixing flange 6c together; then, as shown in FIG. 1, the nuts 11a of the connecting bolts 11 are threaded therein to tighten and fix the upper flange 6a, the lower flange 6b and the fixing flange 6c, constituting the flange joint 6, together. With this, the series of connecting operations are completed.

OTHER EMBODIMENTS

1. The application of the connecting construction for a branch pipe according to the present invention is not limited to the connection of a branch pipe to an existing water pipe. Instead, this construction may be used for connecting a branch pipe to an existing sewage pipe.

2. The closing member may be fixed to the branching pipe portion by means of welding.

The invention may be embodied in other specific forms without departing from the spirit or essential characteristics thereof The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A connecting construction of a branch pipe, comprising:

a branch-pipe joint fixed to an outer peripheral face of an existing pipe and attached to a passage forming member for forming, between the passage forming member and the outer peripheral face of the existing pipe, a semi-circular guide passage extending from a lower portion to an upper portion of the existing pipe along a peripheral direction around the pipe, with the branch-pipe joint being oriented along a radial direction of the existing pipe so that a branching pipe portion thereof for branch-pipe connection is opened at an upper portion within the guide passage; and a closing member inserted in an upper through hole for closing the upper through hole after formation of a lower through hole, the upper through hole and the lower through hole each formed by a cutting means, the upper through hole being provided in an upper pipe wall of the existing pipe for forming, in a lower pipe wall of the existing pipe, the lower through hole communicated with a lower portion inside the guide passage through the branching pipe portion, with the closure of the upper through hole, fluid communication being established between the branch pipe connected to the branching pipe portion and the existing pipe through the guide passage and the lower through hole;

wherein the closing member is fixed to the branching pipe portion, and wherein when the closing member is inserted in the upper through hole, fluid flows through the lower through hole and around the existing pipe through the guide passage, through the branching pipe portion and through the branch pipe operatively connected to the branching pipe portion.

2. A connecting construction as defined in claim 1, wherein the closing member is attached to a support member inserted into the branching pipe portion, and the support member is bolted to a branch-pipe connecting flange formed adjacent a branch-pipe connecting opening of the branching pipe portion.

3. A connecting construction as defined in claim 2, wherein the support member comprises a cylindrical member having an opening communicated with the guide passage and engaged within the branching pipe portion.

4. A connecting construction as defined in claim 3, wherein the closing member is inserted into the upper through hole for closing the upper through hole so that a gap is formed between the closing member and the peripheral edge of the upper through hole.

5. A connecting construction as defined in claim 1, wherein the branch pipe is connected to the branching pipe portion via a short pipe and the branch pipe and the existing pipe are communicated with each other via the guide passage and the lower through hole.

6. A connecting construction as defined in claim 1, wherein the branch-pipe joint includes the tubular passage forming member which is water-tightly connected with the outer peripheral face of the existing pipe and the branching pipe portion for branch pipe connection integrally formed with the passage forming member.

7. A connecting construction as defined in claim 2, wherein the closing member is formed integrally with a lower end of the circular support member fitted within the branching pipe portion and defines an air bleeder hole at the center thereof.

8. A method of connecting a branch pipe, which comprises the steps of:

fixedly and water-tightly connecting a branch-pipe joint to an outer peripheral face of an existing pipe to form a semi-circular guide passage between the outer peripheral face of the existing pipe and an inner peripheral face of the branch-pipe joint;

attaching a partitioning valve to a branching pipe portion for branch-pipe connection;

fixing a first enclosure casing accommodating a cutting means of a boring machine therein to the partitioning valve;

opening the partitioning valve to allow insertion of the cutting means into the guide passage to form an upper through hole in the existing pipe;

removing cutting dust generated in association with the formation of the upper through hole and then inserting the cutting means through the upper through hole to form a lower through hole in the existing pipe;

closing the partitioning valve and then removing the cutting means;

opening the partitioning valve again to lower, through the branching pipe portion, a second enclosure casing accommodating therein a support member including a closing member, thus inserting the closing member into the upper through hole for closing this upper through hole and fixing the closing member in position; and removing the partitioning member and the second enclosure casing and connecting a branch pipe to the support member, wherein when the closing member is inserted in the upper through hole, fluid flows through the lower through hole and around the existing pipe through the guide passage, through a portion of the support member above the closure member and through the branch pipe operatively connected to the support member.

* * * * *